United States Patent
Xu et al.

(10) Patent No.: US 10,334,189 B1
(45) Date of Patent: Jun. 25, 2019

(54) HDR PIXEL ARRAY WITH DOUBLE DIAGONAL BINNING

(71) Applicant: SmartSens Technology (Cayman) Co., Limited., Shanghai (CN)

(72) Inventors: Chen Xu, Shanghai (CN); Yaowu Mo, Shanghai (CN); Zexu Shao, Shanghai (CN); Zhengmin Zhang, Shanghai (CN); Weijian Ma, Shanghai (CN)

(73) Assignee: SmartSens Technology (Cayman) Co., Ltd., Shanghai (CN)

( * ) Notice: Subject to any disclaimer, the term of this patent is extended or adjusted under 35 U.S.C. 154(b) by 0 days.

(21) Appl. No.: 16/001,145

(22) Filed: Jun. 6, 2018

(51) Int. Cl.
- *H04N 5/347* (2011.01)
- *H04N 5/357* (2011.01)
- *H04N 9/04* (2006.01)
- *H04N 5/363* (2011.01)
- *H04N 5/374* (2011.01)

(52) U.S. Cl.
CPC ............ *H04N 5/347* (2013.01); *H04N 5/357* (2013.01); *H04N 5/363* (2013.01); *H04N 5/3742* (2013.01); *H04N 9/045* (2013.01)

(58) Field of Classification Search
CPC ........ H04N 5/347; H04N 5/357; H04N 5/363; H04N 5/3742; H04N 9/045; H04N 19/182; H01L 27/14643; G01J 2001/446
USPC .................................................. 348/294–324
See application file for complete search history.

(56) References Cited

U.S. PATENT DOCUMENTS

| | | | |
|---|---|---|---|
| 6,731,335 B1 | 5/2004 | Kim et al. | |
| 8,908,073 B2 * | 12/2014 | Minagawa | H04N 5/35563 348/302 |
| 9,596,423 B1 | 3/2017 | Molgaard | |
| 9,686,485 B2 | 6/2017 | Agranov et al. | |
| 2010/0200729 A1 * | 8/2010 | Lee | H04N 5/37457 250/208.1 |

OTHER PUBLICATIONS

Yannick De Wit, Tomas Geurts; Title: A Low Noise Low Power Global Shutter CMOS Pixel Having Capability and Good Shutter Efficiency; Date: Unknown; pp. 1-4; Pub: Belgium.

* cited by examiner

*Primary Examiner* — Yogesh K Aggarwal
(74) *Attorney, Agent, or Firm* — Eric Karich; Karich & Associates

(57) ABSTRACT

An image sensor has a pixel cell array comprising clusters of pixel cell blocks each block having four pixel cells under the same microlens and filter wherein during readout electrical signals from two pixels positioned along a first diagonal are binned followed by binning the signals from two pixels positioned along the remaining second reverse diagonal in order to reduce spatial color artifacts associated with orthogonal binning schemes and minimize gaps or irregular spacing between optical centers within an image read out from the array of pixel cells.

8 Claims, 5 Drawing Sheets

HDR PIXEL ARRAY WITH DOUBLE DIAGONAL BINNING

BACKGROUND OF THE INVENTION

Field of the Invention

This invention relates generally to image sensors, and more particularly to CMOS image sensors with pixel arrays configured for multiple pixel binning. The pixel binning combines signals from multiple pixels into a single signal to increase sensitivity when an image is captured at low light levels or to improve dynamic range. The image sensor may be incorporated within a digital camera.

Description of Related Art

An image capture device includes an image sensor and an imaging lens. The imaging lens focuses light onto the image sensor to form an image, and the image sensor converts the light into electrical signals. The electric signals are output from the image capture device to other components of a host electronic system. The image capture device and the other components of a host electronic system form an imaging system. Image sensors have become ubiquitous and may be found in a variety of electronic systems, for example, a mobile device, a digital camera, a medical device, or a computer.

A typical image sensor comprises a number of light sensitive picture elements ("pixels") arranged in a two-dimensional array. Such an image sensor may be configured to produce a color image by forming a color filter array (CFA) over the pixels. Typically, each pixel is overlaid with a monochromatic color filter which is in turn overlaid with a microlens to focus light on to a photodiode. An array of pixels made up of repeating blocks of pixels wherein the blocks are a two by two arrangement of four pixels overlaid with a red, blue and two green color filters comprise a well-known Bayer pattern CFA. The technology used to manufacture image sensors, and in particular, complementary metal-oxide-semiconductor ("CMOS") image sensors, has continued to advance at great pace. For example, the demands of higher resolution and lower power consumption have encouraged the further miniaturization and integration of these image sensors. However, miniaturization has come with the loss of pixel photosensitivity and dynamic range which require new approaches in order to mitigate these losses. In many applications, sensor resolution has exceeded optical resolution, meaning that increasing the pixel density will not necessarily result in image quality gains.

With the decreased pixel size, the total light absorbed within the pixel becomes diminished and some advanced features become challenged. Often the output resolution of the camera system is less than the resolution of the image sensor and then one way to increase the amount of light collected to represent a point in an image is to sum the signals from adjacent or nearby pixels which share the same color filter color. This is called pixel binning and may be used to increase sensitivity when an image is captured at low light levels.

Pixels can also be binned or summed together to decrease the readout time of the image sensor. Binning can be performed in the pixel array or after the signals are read out of the pixel array. Summing the pixels after the pixels have been read out of the pixel array does not decrease the readout time since all of the pixels still have to be read out. Additionally, noise produced by the readout circuitry is summed with the pixel signals, which can reduce the image quality by reducing the signal to noise ratio. Summing the pixels in the pixel array before the pixels are read out can decrease the readout time, but can result in gaps or irregular spacing between the optical centers. The irregular spacing between the optical centers can produce lines in the image that are jagged or uneven, and these undesirable jagged lines can be noticeable to a user. The irregular spacing between the optical centers may also result in an overall significantly lower resolution in the final image compared to an image that is digitally scaled down with the same quantity as the amount of pixels being binned.

Binning is also used occasionally to provide physically large pixels when needed in some optical configurations. Furthermore, binning is sometimes used to give an effectively larger full well capacity for the pixel of the sensor.

In addition to an array of pixels, a typical image sensor substrate or chip further includes readout circuitry. Some portion of the readout circuitry may reside within each pixel depending on demands of a particular design. Two of the most common methods for reading off the image signals generated on a sensor chip are the rolling shutter mode and the global shutter mode. The rolling shutter mode involves exposing different lines of the sensor array at different times and reading out those lines in a chosen sequence. The global shutter mode involves exposing all pixels simultaneously and for the same length of time, similar to how a mechanical shutter operates on a legacy "snapshot" camera. Prior art digital imaging systems have utilized either rolling shutter or global shutter readout modes.

An opportunity for improvement of the image quality in image sensors utilizing binning arises when a certain binning configuration is employed during image readout. The present invention fulfills these needs and provides further advantages as described in the following summary.

SUMMARY OF THE INVENTION

The present invention teaches certain benefits in construction and use which give rise to the objectives described below.

The present invention comprises an image sensor having a plurality of imaging pixel cells. Each pixel cell may have one or more photodiodes, one or more transfer transistors paired with each photodiode, a reset transistor, an amplifier transistor in a source follower configuration, and a rolling shutter readout circuit. Each pixel may also have a global shutter image signal storage and readout circuit block.

The present invention provides an imaging system comprising an array of imaging pixel cell blocks, each pixel cell block comprising four imaging pixel cells sharing the same microlens and color filter color. The four imaging pixel cells are configured in a two by two orthogonal arrangement comprising two adjacent rows (horizontal) and two adjacent columns (vertical). The array of imaging cell blocks of the invention consists of repeating clusters of four blocks of pixel cells wherein one block shares a red color filter and one block shares a blue color filter and two blocks share green color filters. The clusters form a Bayer pattern CFA.

A primary objective of the present invention is to provide an image sensor pixel array and readout method having advantages not taught by the prior art.

An objective of the present invention is to configure four pixel cells under the same microlens and filter and during readout to bin or combine the signals from two pixels positioned along a first diagonal followed by combining the signals from two pixels positioned along the remaining second reverse diagonal in order to reduce spatial color artifacts associated with orthogonal binning schemes.

An additional objective of the present is to provide a pixel cell array that upon binning and readout minimizes gaps or irregular spacing between the optical centers, the irregular spacing between optical centers producing lines in the image that are jagged or uneven, wherein these undesirable jagged lines can be noticeable to a user. The improvement in spacing between the optical centers may also result in an overall significantly improved resolution in the final image.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an image sensor with pixel cells configured as four pixel cells under the same microlens and color filter which during readout bin or combine the signals from two pixels positioned along a first diagonal, followed by combining the signals from two pixels positioned along the remaining second diagonal to reduce spatial color artifacts associated with orthogonal binning schemes.

In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

The terms "connected" and "coupled," which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor).

Figure 1:
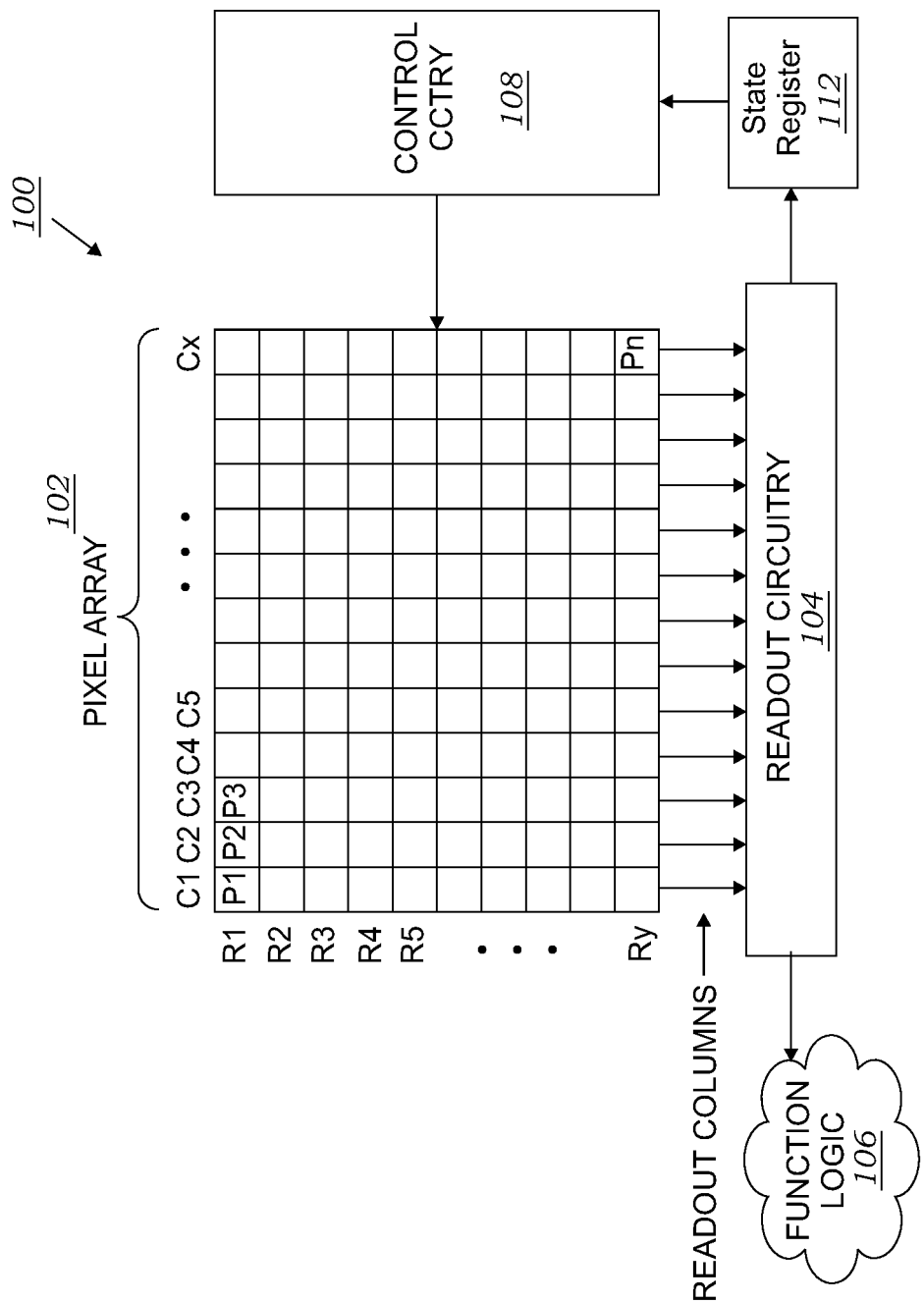
FIG. 1 is a diagram illustrating one example of an imaging system including a pixel array having clustered image sensor pixel cell blocks included in an integrated circuit system according to one embodiment of the present invention.

FIG. 1 is a diagram illustrating a first embodiment of an image sensor system 100 including a pixel array 102 having a plurality of image sensor pixels included in an example integrated circuit system with features in accordance with the teachings of the present invention. As shown in the depicted example, imaging system 100 includes pixel array 102 coupled to control circuitry 108 and readout circuitry 104, which is coupled to function logic 106.

The control circuitry 108 may include a row decoder and a row driver with required timing circuits, while readout circuitry 104 may include a column decoder and a column driver with required timing circuits. The control circuitry 108 and the readout circuitry 104 are in addition coupled to state register 112. In one example, the pixel array 102 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. Pixels in a given row may share reset lines, so that a whole row is reset at a time. The row select lines of each pixel in a row may be tied together as well. The outputs of each pixel in any given column are tied together. Since only one row is selected at a given time by a decoder, no competition for the output line occurs.

In one example, after each pixel has acquired its image data or image charge, the image data is readout by readout circuitry 104 using a readout mode specified by state register or programmable logic function 112 and then transferred to function logic 106. In various examples, readout circuitry 104 may include amplification circuitry, analog-to-digital (ADC) conversion circuitry, or otherwise. State register 112 may include a digitally programmed selection system, i.e., a configuration, to determine whether readout mode is by rolling shutter or global shutter and what timing and signal levels are employed during each mode. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated) or may readout the image data using a variety of other techniques (not illustrated), such as a serial readout or a full parallel readout of all pixels simultaneously. In one example, control circuitry 108 is coupled to pixel array 102 to control operational characteristics of pixel array 102. Some aspects of the operation of control circuitry 108 may be determined by settings present in state register 112. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
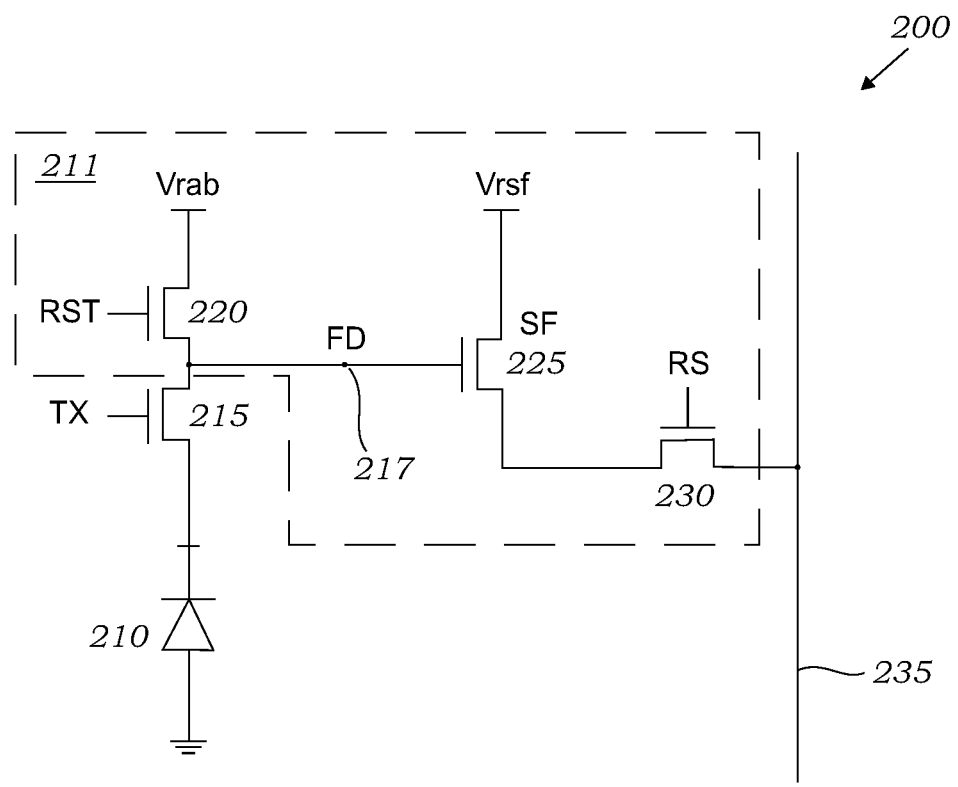
FIG. 2 is an electrical schematic that illustrates one example of an image sensor pixel cell with rolling shutter readout found in the prior art.

FIG. 2 is an electrical schematic that illustrates an image sensor pixel cell 200 with rolling shutter readout found in the prior art. This figure and example pixel are provided to simplify explanation of pixel operation in anticipation of a description of an example of the present invention. Each sensor pixel 200 includes a photodiode 210 (e.g., photosensitive element) and an associated transfer transistor 215 and pixel support circuitry 211 as shown.

Photodiode 210 may be a "pinned" photodiode as is commonly present in CMOS image sensors. In one example, pixel support circuitry 211 includes a reset transistor 220, source follower (SF) amplifier transistor 225, and row select transistor 230. Pixel circuitry 211 is coupled to transfer transistor 215 and photodiode 210 through floating drain FD. During operation, photosensitive element 210 photogenerates charge in response to incident light during an exposure period. Transfer transistor 215 is coupled to receive a transfer signal TX, which causes transfer transistor 215 to transfer the charge accumulated in photodiode 210 to the floating diffusion FD node 217. Floating diffusion node 217 is in effect the drain of transfer transistor 215 while the photodiode is the source of transfer transistor 215. In one embodiment transfer transistor 215 is a metal-oxide semiconductor field-effect transistor (MOSFET). Reset transistor 220 is coupled between power a supply Vrab and floating diffusion node 217 to reset sensor pixel 200 (e.g., discharge or charge floating diffusion node 217 and photodiode 210 to a preset voltage) in response to a reset signal RST. Floating diffusion node 217 is coupled to control the gate terminal of source-follower amplifier transistor 225. Source-follower amplifier transistor 225 is coupled between power rail Vrsf and row select transistor 230 to amplify a signal responsive to the charge on the floating diffusion FD node 217. Row select transistor 230 couples the output of pixel circuitry from the source-follower amplifier transistor 225 to the readout column, or bit line 235, in response to a row select signal RS. Photodiode 210 and floating diffusion node 217 are reset by temporarily asserting both reset signal RST and transfer signal TX. The accumulating time interval (e.g., exposure period) begins when the transfer signal TX is de-asserted, which permits incident light to photo-generate charge in photodiode 210. As photo-generated electrons accumulate in photodiode 210 its voltage decreases (electrons are negative charge carriers). The voltage or charge on photodiode 210 is representative of the intensity of the light incident on photodiode 210 during the exposure period. Also, the higher the intensity of the incident light the more rapidly will the voltage or charge change on photodiode 210. At the end of the exposure period, the reset signal RST is de-asserted, which turns off reset transistor 220 and isolates floating diffusion FD node 217 from Vrab. The transfer signal TX is then asserted to couple photodiode 210 to floating diffusion node 217. The photo-generated charge is transferred from photodiode 210 to floating diffusion FD node 217 through transfer transistor 215, which in turn causes the voltage of floating diffusion FD node 217 to drop by an amount proportional to photo-generated electrons accumulated on photodiode 210 during the exposure period.

Conventionally, CMOS image sensors have several limitations, for example, limited dynamic range and blooming. CMOS imagers generally are characterized by a linear voltage-to-light response, that is, the imager output voltage is approximately linearly proportional to the integrated intensity of the light incident on the imager. The imager output voltage can be characterized by a dynamic range, given as the ratio of the maximum detectable illumination intensity of the imager to the minimum detectable illumination intensity of the imager. It is well understood that the dynamic range of the output voltage sets the overall dynamic range of the imager. The illumination intensity that causes the photodiode capacitance charge to be completely dissipated prior to the end of the exposure period, thereby saturating the pixel, sets the upper end of the pixel dynamic range, while thermally generated photodiode charge and other noise factors set the lower end of the pixel dynamic range. If the dynamic range of a scene to be imaged exceeds the dynamic range of an imager, portions of the scene will saturate the imager and appear either completely black or completely white. This can be problematic for imaging large dynamic range scenes, such as outdoor scenes. Efforts to reduce the impact of reset sampling noise on dynamic range have relied on correlated double sampling (CDS). CDS is a technique of taking two samples of a signal out of the pixel and subtracting the first from the second to remove reset sampling noise. Generally, the sampling is performed once immediately following reset of the photodiode and floating diffusion and once after the photodiode has been allowed to accumulate charge and transfer it to the floating diffusion. The subtraction is typically performed in peripheral circuitry outside of the pixel and may increase conventional image sensor area although it may not increase pixel area. An image sensor utilizing a rolling shutter readout mode may incorporate CDS with only added peripheral circuit elements and no additional circuit elements in the pixel.

Figure 3:
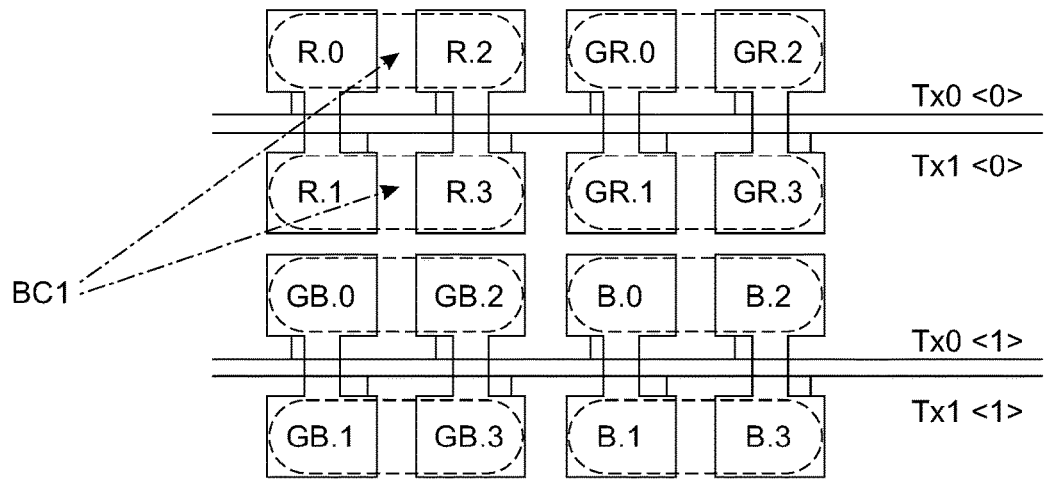
FIG. 3 is a diagram illustrating a prior art pixel cell block cluster layout wherein orthogonal binning results in image point optical center shifting.

FIG. 3 is a diagram illustrating a prior art pixel cell layout wherein orthogonal binning results in image point optical center shifting. A cluster of four pixel blocks, each pixel block comprising four pixels, is shown along with their respective transfer transistor control signal lines Tx. Pixels R.0, R.1, R.2 and R.3 make up a pixel block R, all of these pixels are overlaid with red color filters. Pixels B.0, B.1, B.2 and B.3 make up another pixel block B, all of these pixels are overlaid with blue color filters. Pixel block B lies immediately adjacent to and on a central diagonal to pixel block R. Pixels GR.0, GR.1, GR.2, GR.3 GB.0, GB.1, GB.2 and GB.3 make up two other pixel blocks GR and GB, all of these pixels are overlaid with green color filters. Pixel blocks GR and GB lie immediately adjacent to each other along the other central diagonal of this cluster of four blocks which together form a Bayer color filter pattern which is an elemental configuration for forming an entire image sensor array.

FIG. 3 also illustrates that the same transfer transistor control line Tx0<0> controls the readout of all the pixels along the same row, i.e., the adjacent pixels R0, R2, GR.0 and GR.2. In addition, the same transfer transistor control line Tx1<0> controls the readout of all the pixels along the next vertically positioned row, i.e., the adjacent pixels R.1, R.3, GR.1 and GR.3. Similarly pixels GB.0, GB.2, B.0 and B.2 are controlled by control line Tx0<1> and pixels GB.1, GB3, B.1 and B.3 are controlled by control line Tx1<1>. With this prior art pixel configuration the binning of the pixel pair R.0 and R.2 may be accomplished when control line Tx0<0> is enabled. Also pixel pair GR.0 and GR.2 may be binned together when control line Tx0<1> is enabled. Similarly pixel pair R.1 and R.3 and pixel pair GR.1 and GR.3 may be separately binned when control line Tx1<0> is enabled. This represents orthogonal binning, and one result is that an optical center and a binning center BC1 of pixel pair R.0 and R.2 are positioned between them along a horizontal line. Similarly, the optical center and the binning center BC1 of pixel pair R.1 and R.3 are positioned between them along a horizontal line. There are then two optical centers, one due to each of the two pairs that comprise the pixel block R, which may degrade the resultant image quality in comparison to signals binned in a manner providing a single optical center for the pixel block.

The notations Tx0<0>, Tx0<1>, Tx1<0>, and Tx1<1>, indicate a row by row readout where the following sequence of row by row readout is executed: Tx0<0> followed by Tx1<0> followed by Tx0<1> followed by Tx1<1>.

Figure 4:
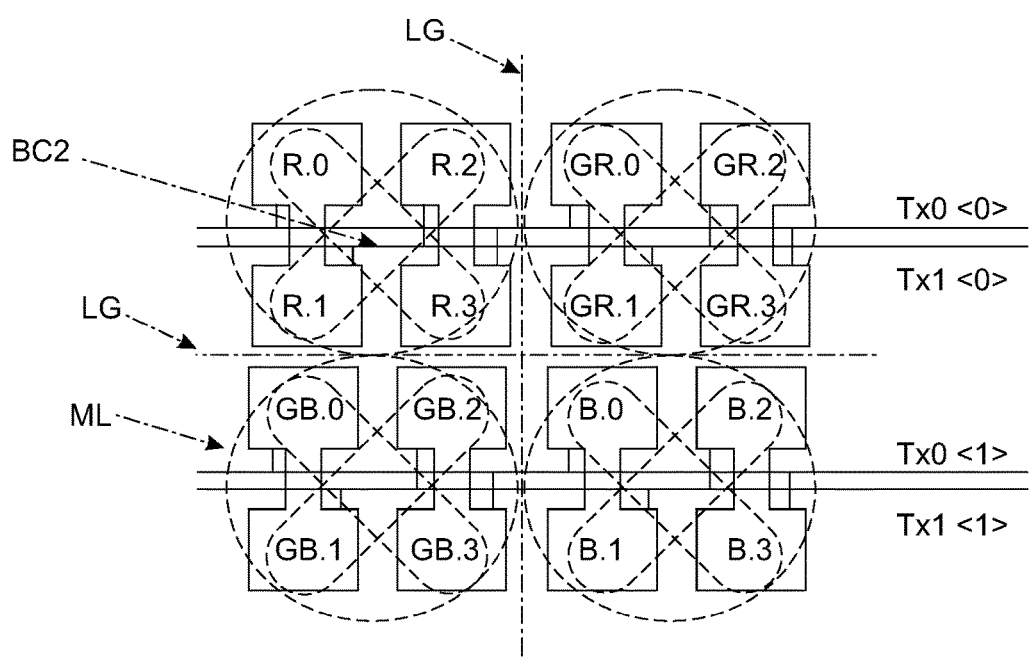
FIG. 4 is a diagram illustrating a pixel cell block cluster layout according the invention wherein diagonal binning results in improved accuracy of image point optical centering.

FIG. 4 is a diagram illustrating a pixel cell layout according to an embodiment of the invention, wherein diagonal binning results in improved image point optical centering. Similar to FIG. 3, a cluster of four pixel cell blocks, each pixel cell block comprising four pixels, is shown along with their respective transfer transistor control signal lines Tx. Pixels R.0, R.1, R.2 and R.3 make up a pixel cell block R, all of these pixel cells are overlaid with red color filters. Pixels B.0, B.1, B.2 and B.3 make up another pixel block B, all of these pixels are overlaid with blue color filters. Pixel block B lies immediately adjacent to and on a central diagonal to pixel block R. Pixels GR.0, GR.1, GR.2, GR.3 GB.0, GB.1, GB.2 and GB.3 make up two other pixel blocks GR and GB, all of these pixels are overlaid with green color filters. Pixel blocks GR and GB lie immediately adjacent to each other along the other central diagonal of this cluster of four blocks which together form a Bayer color filter pattern which is an elemental configuration for forming an entire image sensor array.

FIG. 4 also illustrates that the same transfer transistor control line Tx0<0> controls the readout of the diagonally adjacent pixels along two vertically positioned adjacent rows and within the same pixel block, i.e., the diagonally adjacent pixels R0 and R3, as well as the diagonally adjacent pixels GR.0 and GR.3. In addition, the same control line Tx1<0> controls the readout of the diagonally adjacent pixels along the same two vertically positioned adjacent rows and within the same pixel block, i.e., the diagonally adjacent pixels R.1 and R.2, as well as the diagonally adjacent pixels GR.1 and GR.2. The diagonally adjacent pixels in the same pixel block, i.e. with the same color filter overlay, which are controlled by control line Tx0<0> lie on a reverse adjacent diagonal relative to the diagonally adjacent pixels in the same pixel block which are controlled by control line Tx1<0>.

Similarly diagonally adjacent pixels GB.0 and GB.3, as well as diagonally adjacent pixels B.0 and B.3 are controlled by control line Tx0<1>. Reverse diagonally adjacent pixels GB.1 and GB3, as well as B.1 and B.3 are controlled by control line Tx1<1>. The diagonally adjacent pixels in the same pixel block, i.e. with the same color filter overlay, which are controlled by control line Tx0<1> lie on a reverse adjacent diagonal relative to the diagonally adjacent pixels in the same pixel block which are controlled by control line Tx1<1>.

With this invented pixel configuration the binning of the diagonally adjacent pixel pair R.0 and R.3 within pixel block R may be accomplished when control line Tx0<0> is enabled. Also diagonally adjacent pixel pair GR.0 and GR.3 within pixel block GR may be binned together when control line Tx0<0> is enabled. Similarly reverse diagonally adjacent pixel pair R.1 and R.2 within pixel block R and reverse diagonally adjacent pixel pair GR.1 and GR.2 may be separately binned when control line Tx1<0> is enabled. This represents double diagonal binning within each block of four pixels which share the same color filter color. One result is that the optical center and the binning center BC2 of pixel pair R.0 and R.3 are positioned between the pair along a diagonal line. The optical center and the binning center BC2 of pixel pair R.1 and R.2 are positioned between the pixel pair R.0 and R.3 along a reverse diagonal line and in addition is positioned at the same point as the optical center of the binned pair R.0 and R.3. There is then only one optical center for the binned pixels that comprise pixel block R and this results in an improvement in the resultant image quality in comparison to signals binned in a manner providing two optical centers as provided in the prior art imaging array of FIG. 3.

FIG. 4 separately illustrates one microlens ML positioned over each block of pixels which share the same color filter color. Due to pixel miniaturization, the use of one microlens per pixel may provide a manufacturing challenge that is alleviated somewhat by using one microlens per four pixel block as in the illustrated embodiment of the invention. Also illustrated in FIG. 4, the claimed invention may also comprise an opaque light guide structure LG positioned between the microlenses in order to reduce optical cross talk between pixel blocks not sharing the same microlens. The light guide is absent between the diagonally adjacent pixel cells being binned.

Figure 5:
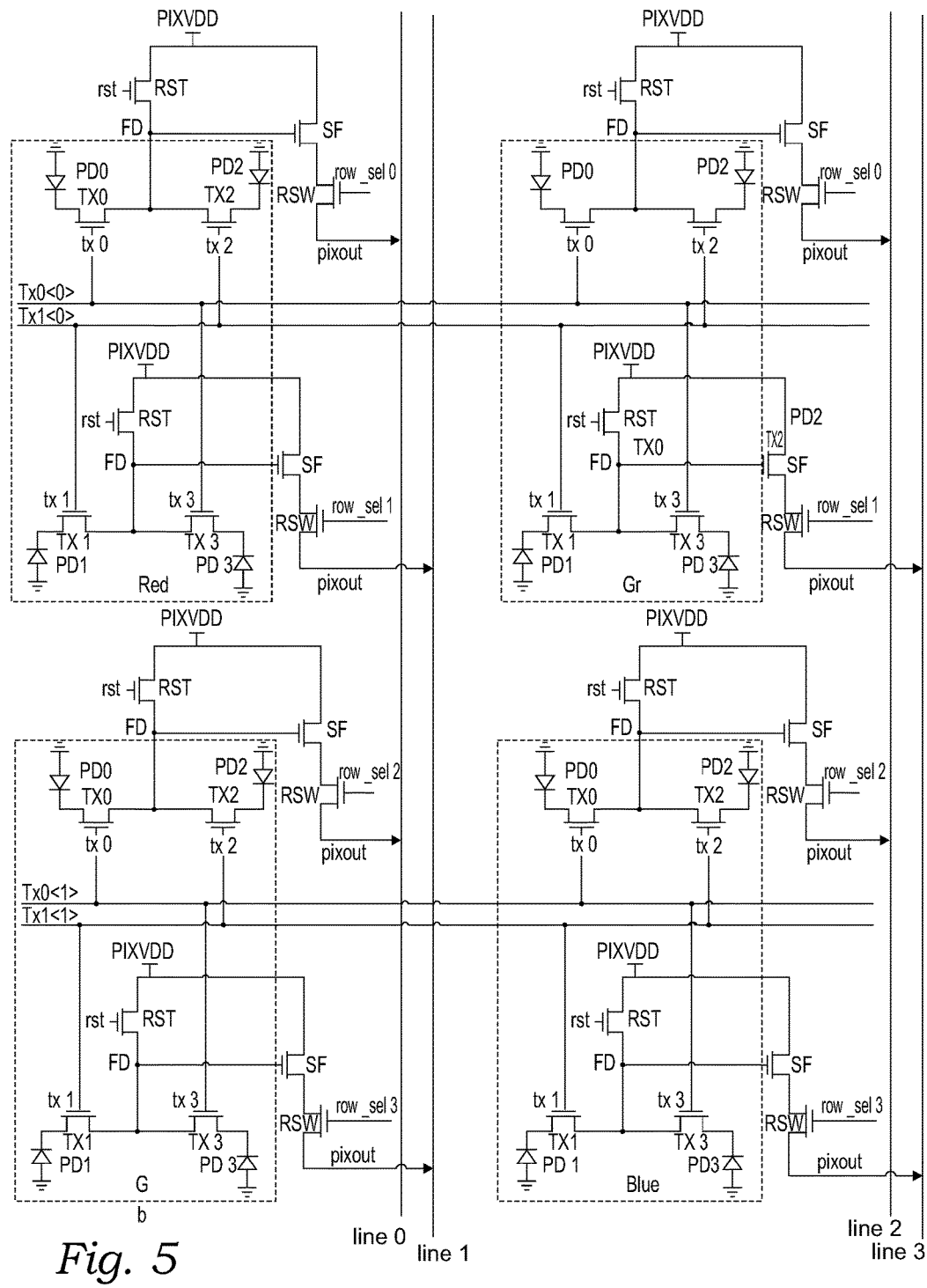
FIG. 5 is an electrical schematic diagram illustrating one embodiment of a pixel cell block cluster according the invention wherein diagonal binning results in improved accuracy of image point optical centering.

FIG. 5 shows an electrical schematic diagram illustrating one embodiment of the pixel cell block cluster illustrated in FIG. 4. The pixel blocks Red, Gr, Gb and Blue are identical except that their respective four photodiodes PD0, PD1, PD2 and PD3 are overlaid with Red, Green, Green and Blue color filters. FIG. 5 illustrates that within the Red block diagonally adjacent photodiodes PD0 and PD3 are electrically connected to transistor control line Tx0<0> as are pixels R.0 and R.3 in FIG. 4. FIG. 5 also illustrates that also within the Red block reverse diagonally adjacent photodiodes PD2 and PD1 are electrically connected to transistor control line Tx1<0> as are pixels R.2 and R.1 in FIG. 4. FIG. 5 additionally shows the electrical components and connections that couple each photodiode to an array column line. In the embodiment of the invention shown in FIG. 5 photodiodes PD0 and PD2 share a common floating drain FD, a common reset transistor RST, a common amplifier transistor SF, a common row select transistor and a common array column line for image signal output. It is also illustrated in FIG. 5 that photodiodes PD2 and PD1 share a common floating drain FD, a common reset transistor RST, a common amplifier transistor SF, a common row select transistor and a common array column line for image signal output. The remaining three pixel blocks Gr, Gb, and Blue in this cluster are comprised of the same arrangements. The four pixel blocks comprise a cluster and clusters are repeated to comprise an imaging pixel array.

In operation this first embodiment of the invention reads out imaging signals from diagonally adjacent pixels in the first two rows of pixels as follows. First transistor control line Tx0<0> is enabled which transfers an image signal from photodiode PD0 to column line 0 and simultaneously from the diagonally adjacent photodiode PD3 to column line 1. The signals from column lines 0 and 1 may then be combined to accomplish a combination or binning of the two diagonally adjacent pixels. Then transistor control line Tx1<0> is enabled which transfers an image signal from photodiode PD2 to column line 0 and simultaneously from the reverse diagonally adjacent photodiode PD1 to column line 1. The signals from column lines 0 and 1 may then be combined or binned to accomplish a combination or binning of the two reverse diagonally adjacent pixels.

The pixel binning described herein previously may be performed after the signals are read out of the pixel array. Binning pixels within the array provides additional advantages. Binning pixels within the array may reduce the readout time since fewer pixels are readout compared to binning after the signals are read out wherein every pixel must be read. This advantage may result in the capability to read at higher frame rates. Fewer combinations are required in the digital domain. An added benefit is that approximately half of the pixel transistors may be eliminated saving power consumption.

Figure 6B:
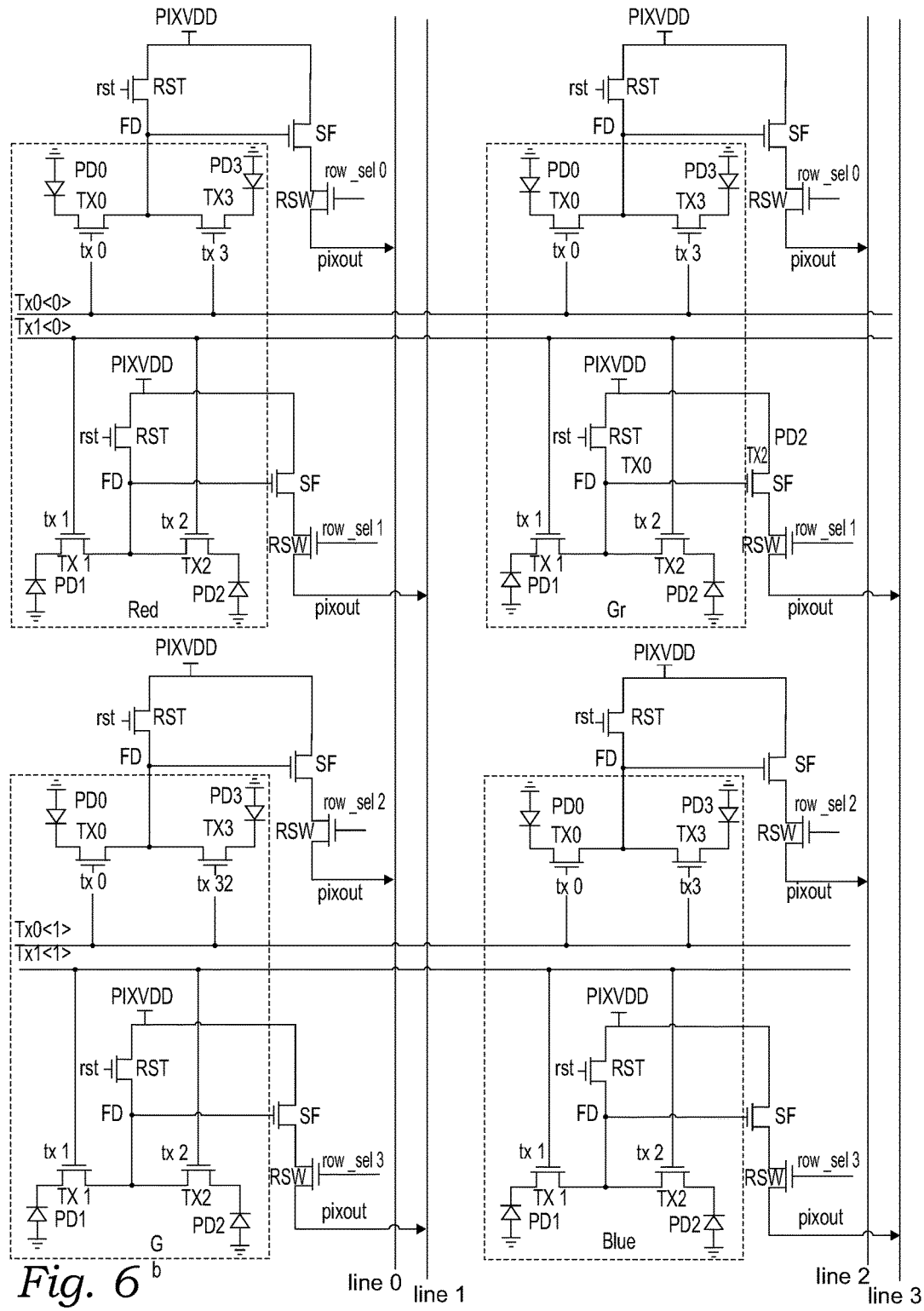
FIG. 6 is an electrical schematic diagram illustrating a second embodiment of a pixel cell block cluster according the invention wherein diagonal binning results in improved accuracy of image point optical centering.

One way the instant invention may be at least accomplished within the pixel array is to electrically interconnect each pixel block such that the diagonally adjacent pixel pairs of each block share a common floating drain, amplifier, row select transistor and output column. The pixel pairs along a reverse diagonal of each block would also share a common floating drain, amplifier, row select transistor and output column. FIG. 6 illustrates a second embodiment of the invention designed to accomplish diagonally adjacent pixel binning within the array.

FIG. 6 is an electrical schematic diagram illustrating an alternate electrical connection scheme for the pixel layout shown in FIG. 4. In an imaging pixel array comprising repeated four pixel block clusters as shown in FIG. 4 the alternate electrical connection scheme shown in FIG. 6 accomplishes diagonal pixel binning at the pixel level. As shown in FIGS. 4, 5 and 6 transistor control line Tx0<0> is connected to, for example, pixel R0 or photodiode PD0 and pixel R3 or photodiode PD3 which are diagonally adjacent pixels. However in FIG. 6 photodiodes PD0 and PD3 share the same floating drain and due to this alternate electrical connection scheme when transistor control line Tx0<0> is enabled the image related signals from photodiodes PD0 and PD3 are combined on their shared floating drain and readout on column line 0. Similarly, again within example pixel block R, pixel R1 or photodiode PD1 and pixel R2 or photodiode PD2 are binned at their common floating drain when control line Tx1<0> is enabled and the combined signal is read out on column line 1.

In summary to enhance the image quality the invented configurations allow for binning of diagonally adjacent pixels and binning of reverse diagonally adjacent pixels within two by two pixel blocks within clusters of four pixel blocks comprising a Bayer color filter pattern. This represents double diagonal binning within each block of four pixels which share the same color filter color and one result is that the optical centers of pixel pairs lie between them along a diagonal line and in the same location. There is then only one optical center for the binned pixels that comprise the pixel block and this results in an improvement in the resultant image quality in comparison to signals binned in a manner providing two optical centers as provided in the prior art imaging array wherein orthogonal binning is employed.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top", "down", "above", "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An imaging system comprising:
   an array of pixel cell clusters, each pixel cell cluster comprising four pixel cell blocks arranged in a two by two configuration, and each pixel cell block comprising four pixel cells arranged in a two by two configuration to form a first diagonally adjacent pair and a second reverse diagonally adjacent pair of pixel cells to form rows and columns of pixels;
   a color filter with same color disposed over each pixel cell block wherein the four pixel cell blocks forming their associated cluster form a Bayer color filter array over each cluster;
   a single plano-convex microlens disposed over the color filter and the four pixels of each pixel cell block; and
   a control and readout circuit for each pixel cell block, wherein each pixel cell comprises a photodiode controlled by a transfer transistor and a transfer transistor control line, wherein the transfer transistors of the first diagonally adjacent pair of pixel cells share a first transfer transistor control line, and the transfer transistors of the second reverse diagonally adjacent pair of pixels share a second transfer transistor control line.

2. The imaging system of claim 1, wherein within each pixel cell block, the two horizontally adjacent pixel cells lying on a first row of pixel cells share a common floating drain, amplifier transistor, row select transistor, and connection to a first column line; and wherein within each pixel cell block, the two horizontally adjacent pixel cells lying on a second row of pixel cells share a common floating drain, amplifier transistor, row select transistor, and connection to a second column line.

3. The imaging system of claim 1, wherein within each pixel cell block, the two diagonally adjacent pixel cells lying on two vertically positioned adjacent rows of pixel cells share a common floating drain, amplifier transistor, row select transistor, and connection to a first column line; and wherein within each pixel, cell block the two reverse diagonally adjacent pixel cells lying on the two vertically positioned adjacent rows of pixel cells share a common floating drain, amplifier transistor, row select transistor, and connection to a second column line.

4. The imaging system of claim 1, further comprising an opaque light guide structure positioned between the microlenses, wherein the light guide is absent between the diagonally adjacent pixel cells and the reverse diagonally adjacent pixel cells comprising the pixel cell block.

5. A method for providing binning and readout of adjacent pixel cells within a two by two block of pixel cells which minimizes gaps or irregular spacing between optical centers within an image read out from an array of pixel cells, the method comprising the steps of:
  providing an array of pixel cell clusters, each pixel cell cluster comprising four pixel cell blocks arranged in a two by two configuration and each pixel cell block comprising four pixel cells arranged in a two by two configuration to form a first diagonally adjacent pair and a second reverse diagonally adjacent pair of pixel cells to form rows and columns of pixels;
  providing a color filter with same color disposed over each pixel cell block wherein the four pixel cell blocks forming their associated cluster form a Bayer color filter array over each cluster;
  providing a single plano-convex microlens disposed over the color filter and the four pixels of each pixel cell block;
  providing a control and readout circuit for each pixel cell block, wherein each pixel cell comprises a photodiode controlled by a transfer transistor and a transfer transistor control line, wherein the transfer transistors of the first diagonally adjacent pair of pixel cells share a first transfer transistor control line, and the transfer transistors of the second reverse diagonally adjacent pair of pixels share a second transfer transistor control line, and wherein within each pixel cell block the two horizontally adjacent pixel cells lying on a first row of pixel cells share a common floating drain, amplifier transistor, row select transistor, and connection to a first column line, and wherein within each pixel cell block the two horizontally adjacent pixel cells lying on a second row of pixel cells share a common floating drain, amplifier transistor, row select transistor, and connection to a second column line; and
  focusing light from a target scene onto the pixel array and enabling the first transfer transistor control line to cause the electrical signals from the first diagonally adjacent pair of pixel cells to be read out simultaneously onto the first and second column lines, whereupon binning of the two electrical signals is subsequently completed and then enabling the second transfer transistor control line to cause the electrical signals from the second reverse diagonally adjacent pair of pixel cells to be read out simultaneously onto the first and second column lines whereupon binning of the two electrical signals is subsequently completed.

6. The method of claim 5, wherein combining the electrical signals on the first column line and on the second column line when the first transfer transistor control line is enabled comprises the binned signal representative of the first diagonally adjacent pair of pixel cells with an optical center coincident with the physical center of the first diagonally adjacent pair of pixel cells, and wherein combining the electrical signals on the first column line and on the second column line when the second transfer transistor control line is enabled comprises the binned signal representative of the second reverse diagonally adjacent pair of pixel cells with an optical center coincident with the physical center of the second reverse diagonally adjacent pair of pixel cells.

7. A method for providing binning and readout of adjacent pixel cells within a two by two block of pixel cells which minimizes gaps or irregular spacing between optical centers within an image read out from an array of pixel cells, the method comprising the steps of:
  providing an array of pixel cell clusters, each pixel cell cluster comprising four pixel cell blocks arranged in a two by two configuration and each pixel cell block comprising four pixel cells arranged in a two by two configuration to form a first diagonally adjacent pair and a second reverse diagonally adjacent pair of pixel cells to form rows and columns of pixels;
  providing a color filter with same color disposed over each pixel cell block wherein the four pixel cell blocks forming their associated cluster form a Bayer color filter array over each cluster;
  providing a single plano-convex microlens disposed over the color filter and the four pixels of each pixel cell block;
  providing a control and readout circuit for each pixel cell block wherein each pixel cell comprises a photodiode controlled by a transfer transistor and a transfer transistor control line wherein the transfer transistors of the first diagonally adjacent pair of pixel cells share a first transfer transistor control line and the transfer transistors of the second reverse diagonally adjacent pair of pixels share a second transfer transistor control line and wherein within each pixel cell block the two diagonally adjacent pixel cells lying on two vertically positioned adjacent rows of pixel cells share a common floating drain, amplifier transistor, row select transistor and connection to a first column line and wherein within each pixel cell block the two reverse diagonally adjacent pixel cells lying on the two vertically positioned adjacent rows of pixel cells share a common floating drain, amplifier transistor, row select transistor and connection to a second column line;
  focusing light from a target scene onto the pixel array and enabling the first transfer transistor control line to cause immediate binning of the electrical signals from the first diagonally adjacent pair of pixel cells onto the first column line and then enabling the second transfer transistor control line to cause immediate binning of the electrical signals from the second reverse diagonally adjacent pair of pixel cells onto the second column line.

8. The method of claim 7, wherein combining the electrical signal on the first column line when the first transfer transistor control line is enabled with the electrical signal on the second column line when the second transfer transistor control line is enabled comprises a binned signal representative of the first diagonally adjacent pair of pixel cells combined with a binned signal representative of the second reverse diagonally adjacent pair of pixel cells with an optical center coincident with the physical center of the block of four pixels.

* * * * *